March 24, 1931.    A. T. KASLEY    1,797,235
VIBRATION METER
Filed Jan. 24, 1924    3 Sheets-Sheet 1

March 24, 1931.　　　A. T. KASLEY　　　1,797,235

VIBRATION METER

Filed Jan. 24, 1924　　　3 Sheets-Sheet 2

WITNESS

A. T. Kasley
INVENTOR

BY

ATTORNEY

March 24, 1931. A. T. KASLEY 1,797,235
VIBRATION METER
Filed Jan. 24, 1924  3 Sheets-Sheet 3
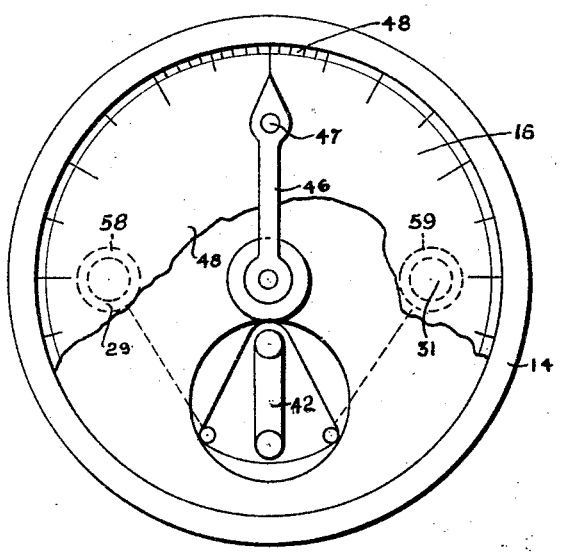
Fig.6.
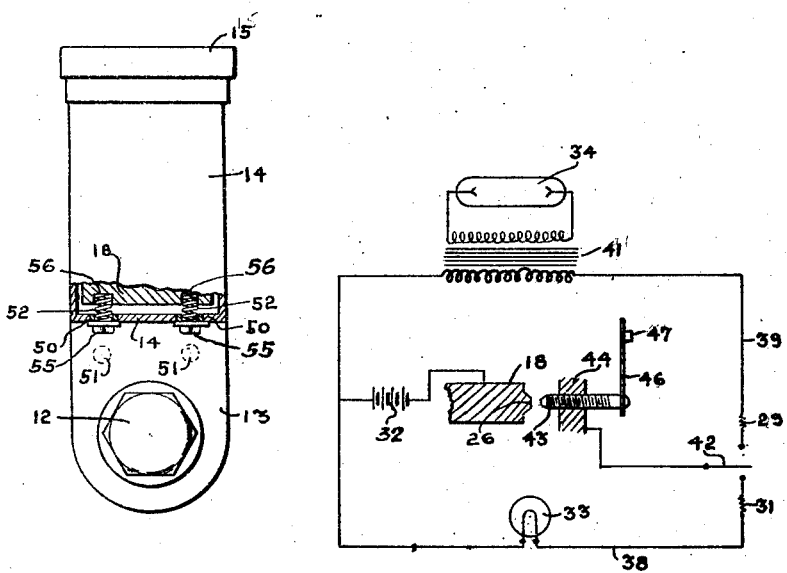
Fig.7.
Fig.8.
A. T. Kasley
INVENTOR
BY D. C. Davis
ATTORNEY Patented Mar. 24, 1931

1,797,235

UNITED STATES PATENT OFFICE

ALEXANDER T. KASLEY, OF ESSINGTON, PENNSYLVANIA, ASSIGNOR TO WESTINGHOUSE ELECTRIC AND MANUFACTURING COMPANY, A CORPORATION OF PENNSYLVANIA

VIBRATION METER

Application filed January 24, 1924. Serial No. 688,330.

My invention relates to devices for measuring the amplitude of vibrations and has for an object to provide apparatus of the character designated which shall be simple, compact of design and reliable in operation.

More specifically the object of my invention is to provide a vibration meter which shall be useful for determining dynamic unbalance in rotary bodies, especially under service conditions.

Figure 1:
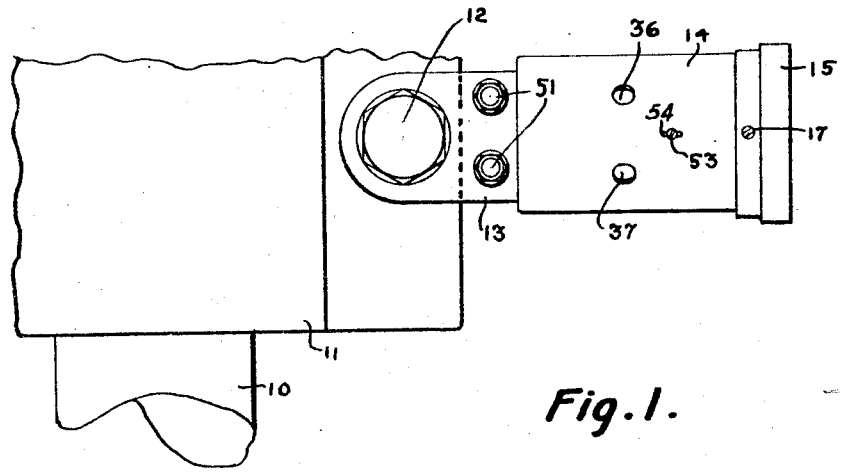
Figure 2:
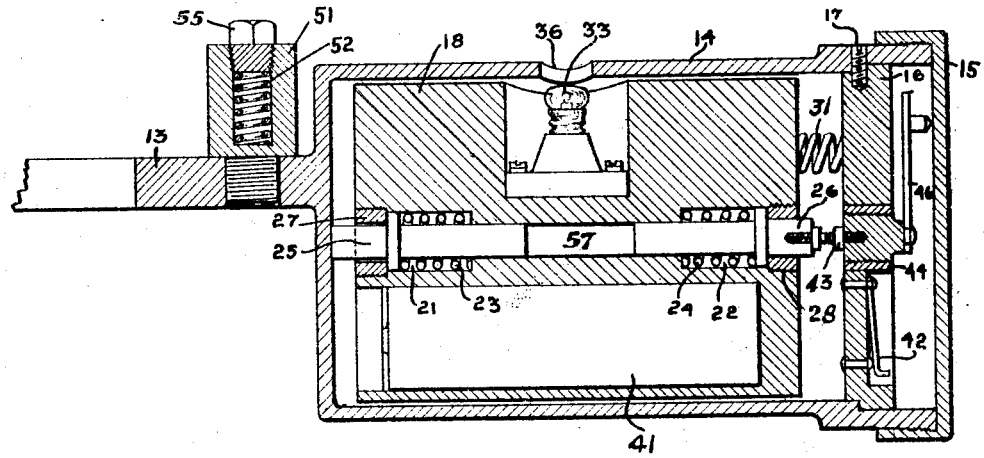
Figure 4:
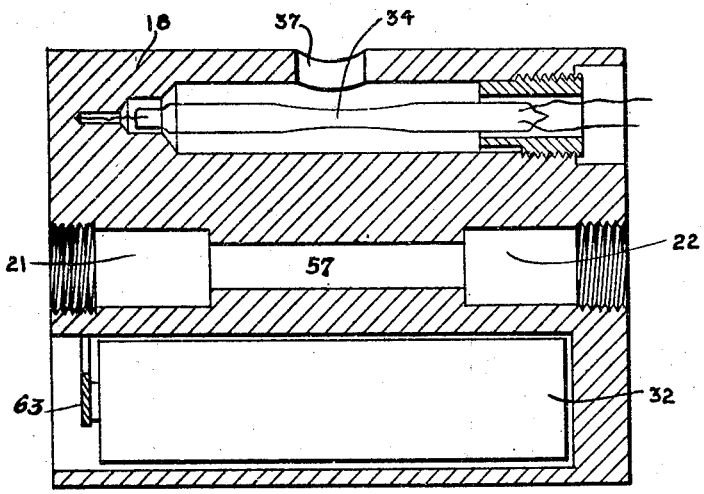
Figure 5:
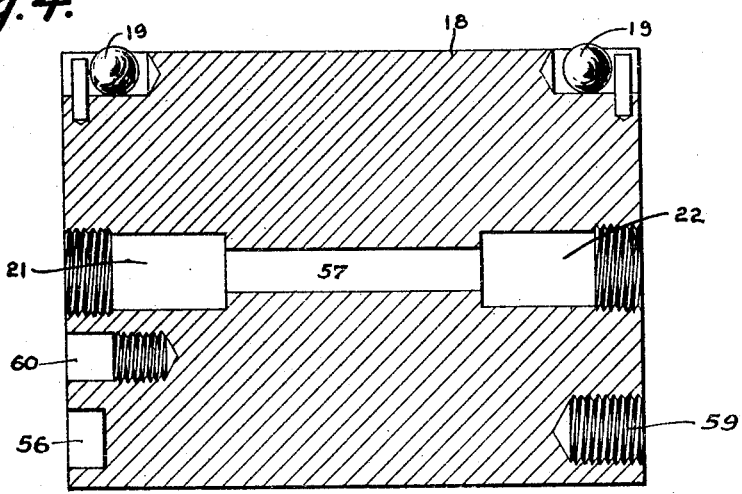
Figure 3:
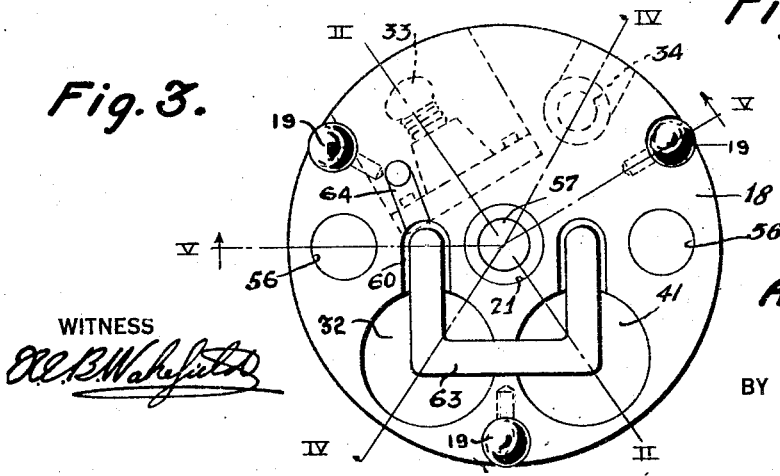

Apparatus embodying features of my invention is illustrated in the accompanying drawings in which:

Fig. 1 is an assembled plan view of the device showing means for attaching it to a vibratory structure; Fig. 2 is a sectional view of the casing and the interior member taken along the plane II—II of Fig. 3, except for the connecting lug, whose section is in a plane transverse thereto; Fig. 3 is an end view of the interior member of the apparatus, showing the same as seen from the left in Figs. 2, 4 and 5; Fig. 4 is a sectional view of a part of the device along the plane IV—IV of Fig. 3; Fig. 5 is a sectional view of a part along the plane V—V of Fig. 3; Fig. 6 is an end view of the apparatus, showing the same with the cover removed, as seen from the right in Figs. 2, 4 and 5; Fig. 7 is an assembly view of the apparatus, partly in section, showing its adaptation to measure vibrations in a vertical direction; and Fig. 8 is a schematic view showing the electrical wiring employed in connection with the indicating means of my device.

In the manufacture of heavy machinery, such as steam turbines, electrical generators and the like, it is customary to place the rotating parts in static and dynamic balance in the shop where built, before final assembly. It often occurs, however, that after such machines have been placed in service, the rotating parts are found to be in a seriously unbalanced condition, developing vibrations such as to endanger the machines and their attendants. It has heretofore been a very difficult and expensive operation to put such machines in dynamic balance after assembly in the plant where installed, due to lack of accurate means for determining the amount of unbalance or the location of the plane of unbalance in such a body.

It is well known in the art that, if the amplitude of the vibrations caused by the unbalanced condition of a rotating body may be accurately measured, the amount of unbalance and the location of the plane of unbalance may be readily determined by the addition of known weights in selected places on the rotating body, observing the vibrations caused by those weights, and from these observations computing the amount and plane of original unbalance.

I accordingly provide apparatus which accurately determines the amplitude of vibrations of a vibratory structure and when attached to a vibratory rotating body the unbalanced condition of that body can be readily determined and corrected. For accomplishing this result I provide a small compact device having a member for attachment to some convenient part, such as a bearing cap bolt, of the vibratory structure to be observed. Within the device is a massive body riding on anti-friction bearings between two abutments, said bearings rendering said massive body substantially free from oscillations occurring in the remaining parts of the device. When the unbalanced structure vibrates, that part of my apparatus attached thereto also vibrates and is displaced with respect to said massive body. By means of suitable electric circuits, together with means for indicating the opening or closing of the circuits by contact of said massive body with said abutments, the exact amount of relative displacement between the body and the rest of the apparatus may be readily determined.

Turning now to the drawings for a more detailed description of my apparatus, I show in Fig. 1 at 10, a shaft of a rotating vibratory structure to be observed. At 11 is indicated a bearing housing having a bearing cap bolt 12 to which my vibration meter is attached by means of a lug 13.

The vibration meter comprises a casing 14 having a removable cover 15. In Fig. 2 is shown a removable head 16 within the casing 14 which is secured thereto by a suitable number of screws 17. Disposed within the casing and having a suitable clearance with respect thereto, is an interior member or massive body 18 which rides within the casing on anti-friction bearings 19—19, Fig. 3 and Fig. 5.

In the left end of the body 18 as shown in Figs. 2, 4 and 5 is a recess 21 and in the right end a recess 22 which serve to accommodate springs 23 and 24, respectively, said springs being in compression against flanges of plungers 25 and 26 which are held in position by bushings 27 and 28. The inner ends of plungers 25 and 26 extend into opening 57, which extends between recesses 21 and 22. As shown in the drawings, the outer end of plunger 25 extends without the bushing 27 and when the body is at rest is in contact with the casing 14 at the left as shown. The outer end of the plunger 26 extends without the bushing 28 and serves to cushion the vibrations of the body when in motion, and also serves another purpose to be described later.

Disposed between the body 18 and the removable head 16 are two springs 29 and 31 (Figs. 6 and 8), which, in cooperation with the spring 23, serve to bias the body 18 toward a fixed central position within the casing and also serve to complete electrical circuits to be described later. The springs 29 and 31 are disposed in recesses 58 and 59, being held therein by an insulating compound.

From the structure so far described it will be apparent, if this apparatus is attached to a vibratory structure and firmly secured thereto as shown in Fig. 2, that as the structure vibrates, the casing 14 and parts secured thereto will vibrate with the structure and that the massive body 18, due to its inertia will have a tendency to remain in a fixed position. This results in a relative displacement of the casing 14 and the parts secured thereto with respect to the body 18, this displacement or oscillation with respect to the body 18 being proportionate to the amplitude of the vibrations of the vibratory structure. Having thus provided a member having means for attachment to a vibratory structure to be tested, a body associated with such member, and means permitting relative oscillatory movements of the body and the member, the next step is the provision of means for measuring the amplitude of the oscillations.

For measuring the amount of displacement or the amplitude of the oscillations, I provide a source of electrical energy such as a battery 32, Figs. 3 and 8. This battery furnishes electrical current for lighting an incandescent light 33, or for producing a discharge of electricity through an electrical discharge tube 34, said tube preferably containing a rarefied inert gas such as neon gas. A U-shaped member 63 provides electrical connection with the battery 32 for lamp 33 and coil 41. One end is seated in recess 60, from where connection with lamp 33 may be made through passage 64. The incandescent light 33 and the discharge tube 34 are carried by the body 18, and holes 36 and 37 are provided in the casing 14 for observing when the circuits through these lights are completed or broken. At 38 in Fig. 8, is indicated a circuit to the incandescent light 33 and at 39 is indicated a circuit leading to the primary of an induction coil 41 which serves to produce a discharge of electricity through the discharge tube 34 when the circuit 39 is completed or broken. A double-throw switch 42 serves to connect the source of electrical energy 32 with either circuit through the springs 29 and 31 already described, as desired. For completing either circuit, an adjustable contact member 43 is screwed through a bushing 44 within the removable head 16. This contact member engages with the plunger 26 previously described and serves to complete either the circuit 38 or the circuit 39, as desired, through the body 18. While I have shown the source of electrical energy 32 as being incorporated within the body 18, it will be apparent to those skilled in the art that the circuits illustrated could be employed with a source of electrical energy located without the vibration meter by providing suitable wiring connections.

The adjustable contact member 43 is provided with a pointed crank arm 46 having a handle 47 for screwing the contact in or out of the head 16. The head 16 is provided with graduations 48 and by means of these graduations and the pointed contact arm 46, the relative position of the body 18 and of the head 16 is indicated.

The structure thus far described is best suited for horizontal attachment to a vibratory structure. It may occur, however, that with certain machines to be observed it would become necessary or desirable to measure vibrations in a vertical direction. To accomplish this purpose, I provide receptacles 51—51 on the lug 13 in which are contained springs 52—52, as shown in Fig. 2. Whenever it is desired to measure vibrations in a vertical direction, these springs are taken out of the receptacles 51 and inserted through holes 50—50 in the casing 14 in the end thereof adjacent to the lug 13 the inner ends being seated in recesses 56—56 of body 18 and the outer ends being held by caps 55—55 screwed into openings 50—50. The springs 52—52 are then in compression between the casing 14 and the body 18 and support the body 18 in spaced relation to casing 14. These springs are of sufficient scale to just balance the weight of the body 18 when in a vertical position and in this way permit the casing 14 to be displaced with respect to the body 18 when attached in a vertical position to a vibratory structure, in the same manner as when in a horizontal position with the springs 52 removed. When the apparatus is not in use it is, of course, desirable that the body 18 be firmly secured in place so that no damage will occur in handling or in shipment. For this purpose, I provide a screw 53, (Fig. 1), extending through a slot 54 in the casing 14 and into the body 18 which is tightened down and the body 18 secured in position when not in use. This screw also serves to prevent rotation of body 18 in the casing when the apparatus is in use, the screw being retracted sufficiently to permit it to slide in slot 54.

The operation of my improved apparatus is as follows: The vibration meter is attached in the manner already described to a body to be observed when that body is at rest. The screw 53 is loosened, and the cover 15 is removed so as to give access to the adjustable contact 43 and to the double-throw switch 42. The double-throw switch 42 is thrown so as to connect the source of electrical energy with the circuit 38 leading to the incandescent light 33. The adjustable contact member 43 is then screwed in until it engages the plunger 26 and completes this circuit, causing the lamp 33 to light. The pointer of the arm 46 on the indicator card 48 now indicates the relative position of the body 18 and the head 16. The incandescent lamp is used for observation purposes when the body is at rest because, depending upon a flow of electrical energy, it will light up upon completion of the circuit 38.

When this reading has been taken, the contact arm 46 is rotated so as to back off the adjustable contact member 43 from the plunger 26 and the double-throw switch 42 is thrown so as to connect the source of electrical energy 32 with the circuit 39 leading to the induction coil 41. The structure to be tested is next put in operation and allowed to acquire the speed at which observations are to be made. Having acquired this speed, the adjustable contact member is next screwed in until, at the extreme limit of displacement or oscillatory movement of the casing 14 with respect to the body 18, it momentarily engages the plunger 26. The continuous vibrations of the structure under observation causes the making and breaking of the circuit 39 through the coil 41, the body 18, the plunger 26 and the contact member 43. This making and breaking of the circuit 39 produces a discharge of electricity through the tube 34 which instantaneously lights up as the circuit is made and broken. The pointer on the arm 46 now shows on the graduations 48 the point at which the circuit 39 is made and broken and, by referring to the first reading taken, the amplitude of displacement or of oscillation with respect to the body 18, may be determined, the pitch of the screw 43 being known. The difference between the indication at the first reading and the last reading is one half the amplitude of the displacement or oscillation with respect to the body 18.

I prefer to use an electrical discharge tube for indicating the closure of the circuit 39 when the structure under observation is in operation because of the fact that the action of the discharge tube is instantaneous. If an incandescent lamp were used, such as when taking the reading when the device is at rest, a certain time would be required to heat up the filament of the lamp and, after being heated up, there would be some after-glow after the circuit had been broken thus preventing accurate observation. The discharge tube is instantaneous and has no after-glow, hence the exact point at which the circuit 39 is made and broken is shown by the tube 34 and the graduations 48.

Having determined the amplitude of the vibrations of the structure under observation in the manner described, arbitrary weights are added at certain points on the body and further observations made with the weights added. As is well known in the balancing art, the amplitude of the vibrations of the structure under observation with these weights added being known, the amount of unbalance and the location of the original plane of unbalance may be readily calculated and corrected.

From the foregoing, it is apparent that I have provided a vibration meter which is simple and compact in design, with which very accurate observations may be made and one that is useful in determining dynamic unbalance in rotary bodies in the field under service conditions.

While I have shown by invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an apparatus of the class described, the combination of an inertia member, a carrier therefor, means for indicating the relative inactive position of said inertia member with respect to said carrier, means for indicating the magnitude of displacements occurring under vibration, and common means for rendering either of said indicating means effective.

2. In an apparatus of the class described, the combination of a device according to claim 1 in which the indicating means are carried by the inertia member.

3. In an apparatus of the class described, the combination of an inertia member, a carrier member therefor, and means for indicating the relative inactive position of said members and the extent of the relative displacements under vibration, said means including a plurality of circuits, a lamp in one of said circuits for indicating the relative inactive positions, and a discharge tube in another of said circuits for indicating the extent of relative displacements.

4. In an apparatus of the class described, the combination of an inertia member, a carrier member therefor, means for indicating the relative inactive positions of said members, means for indicating the occurrence of maximum relative displacements under vibration, said first-mentioned indicating means including a circuit and a lamp in said circuit and the second-mentioned indicating means including a circuit and a discharge tube and a coil in said circuit, and means for energizing any one of said circuits.

5. In an apparatus of the class described, the combination of a device according to claim 4 in which the indicating means are carried by the inertia member.

6. A vibration meter comprising a member having means for attachment to a vibratory structure to be tester, a body supported by said member, said body being loosely mounted with respect thereto permitting relative oscillatory movements of the body and the member, an electrical circuit, means for opening and closing said circuit upon vibration of said member, and means for indicating the relative position of the body and the member upon opening and closing of the circuit.

7. In a vibration meter, a member having means for attachment to a vibratory structure to be tested, whereby said member vibrates in synchronism with said structure, a body associated with said member, resilient means for urging the body toward a fixed position with respect to the member and permitting said body to remain substantially fixed when the member is subjected to the vibrations of the vibratory structure, and an electrical circuit including means for opening and closing it at the maximum relative displacement of the body with respect to the member, and means for indicating the relative position of the body and the member upon opening and closing of the circuit for measuring the amplitude of the relative displacement.

8. In a device of the class described, the combination of an inertia member, a carrier for supporting the inertia member, said inertia member being arranged in the carrier to provide for relative displacement thereof in one direction with respect to the carrier, said carrier being adapted to be disposed in positions providing said relative displacement in vertical, horizontal or inclined directions, means providing limits for limiting the displacement of the inertia member with respect to the carrier, yieldable means tending to maintain the inertia member in spaced relation between said limits, other yieldable means for substantially balancing the weight of the inertia member and adapted to be made effective only when the carrier is disposed in positions providing said relative displacement in vertical or inclined directions, and means for indicating the occurrence of displacements of said inertia member.

9. A device according to claim 8, and means on the carrier for varying said limits and for indicating the amount of such variation.

10. In an apparatus of the class described, the combination of an inertia member, a carrier member therefor, a lamp and a discharge tube disposed on the upper portion of the inertia member, a battery secured to a lower portion of the inertia member, a coil attached to a lower portion of the inertia member adjacent the battery, a plurality of circuits including the carrier member and the inertia member, one of said circuits including the lamp, another of said circuits including the discharge tube, means for energizing any one of said circuits, means including the lamp circuit for indicating the relative inactive positions of the inertia member, and means including the discharge tube for indicating the positions of the inertia member under vibration.

In testimony whereof, I have hereunto subscribed my name this 16th day of January, 1924.

ALEXANDER T. KASLEY.